United States Patent [19]

Schmitt

[11] 4,195,959

[45] Apr. 1, 1980

[54] ARTICLE STACKING APPARATUS

[75] Inventor: Robert A. Schmitt, Vancouver, Wash.

[73] Assignee: Columbia Machine, Inc., Vancouver, Wash.

[21] Appl. No.: 878,704

[22] Filed: Feb. 17, 1978

[51] Int. Cl.$^2$ ............................................. B65G 57/10
[52] U.S. Cl. ........................................ 414/35; 414/85; 414/89
[58] Field of Search ................... 214/6 P, 6 DK, 6 S; 271/84, 269; 414/85, 35, 89

[56] References Cited

U.S. PATENT DOCUMENTS

| | | | |
|---|---|---|---|
| 2,768,756 | 10/1956 | Horman | 214/6 DK |
| 3,130,839 | 4/1964 | Grasvoll | 214/6 DK |
| 3,294,257 | 12/1966 | Davies et al. | 214/6 P |
| 3,433,372 | 3/1969 | Galloway | 214/6 P X |
| 3,520,422 | 7/1970 | Bruce et al. | 214/6 P |
| 3,594,977 | 7/1971 | Grasvoll | 214/6 DK X |
| 3,905,487 | 9/1975 | Hoke et al. | 214/6 S |

*Primary Examiner*—L. J. Paperner
*Attorney, Agent, or Firm*—Kolisch, Hartwell, Dickinson & Stuart

[57] ABSTRACT

Palletizing apparatus having extendable/retractable pusher arms. The apparatus includes a frame on which are mounted a layer-arranging table, a horizontally shiftable transfer carriage which mounts the pusher arms, a vertically shiftable stacking platform, and a vertically shiftable finger rake. The surfaces of the table and carriage are each formed from a plurality of laterally-spaced elongate members, with the table and carriage elongate members being interspersed to permit the carriage to shift longitudinally within the surface region of the table. The pusher arms, when extended, positively engage articles arranged on the layer-arranging table, thus serving to push the articles from the layer-arranging table to a position vertically adjacent the stacking platform when the transfer carriage is shifted downstream. At the latter position, the finger rake is lowered to positively engage the sheet articles and the pusher arms are retracted. As the carriage is returned to its upstream position, the articles engaged by the finger rake fence are raked onto the stacking platform, while the pusher arms traverse the length of the layer-arranging table below newly loaded articles on the layer-arranging table. Articles can thus be simultaneously raked onto the stacking platform and loaded onto the layer-arranging table.

6 Claims, 12 Drawing Figures

ARTICLE STACKING APPARATUS

BACKGROUND AND SUMMARY

The present invention relates to article handling devices, and in particular, to devices for stacking sheets or the like.

A recently-developed article stacker employs a horizontally shiftable overhead rake for transferring sheet articles from a vertically-shiftable layer-arranging table to a transfer carriage. The surfaces of the table and the carriage are formed by laterally-spaced elongate members, and the tines of the rake are positioned to extend into the spaces between these members when the layer-arranging table and transfer carriage are horizontally adjacent. This arrangement ensures that the tines will positively engage all of the sheets of a sheet stack as the sheets are raked from the layer-arranging table to the transfer carriage.

The present invention differs from the above-described article stacker in that the layer-arranging table and transfer carriage are formed from a plurality of laterally spaced elongate member which are interspersed one with the other to allow the transfer carriage to shift horizontally within the region of the layer-arranging table. This feature allows the transfer carriage to be shifted between upstream and downstream positions without having to alternately raise and lower the layer-arranging table, as is necessary in the first-described device.

The invention further comprises a plurality of pusher arms attached to the upstream ends of the carriage elongate members, these arms being extendable to positively engage articles as the carriage is shifted in the downstream direction, and retractable to a position below the upper surface of the layer-arranging table when the carriage is shifted upstream. Retraction of the pusher arms allows the transfer carriage to be shifted in the upstream direction below the layer-arranging table having newly-loaded articles thereon.

Further disclosed in the present invention is a vertically shiftable overhead rake which positively engages the articles as the carriage is moved in the upstream direction, thereby to sweep articles from the transfer carriage onto the stacking platform.

It is a principal object of the present invention to provide an efficient article stacking apparatus for palletizing articles.

Specifically, it is an object of the present invention to provide a palletizer having a transfer carriage adapted to shift horizontally within the region of a layer-arranging table, the transfer carriage mounting pusher arms which are retractable to allow articles to be simultaneously loaded and palletized.

It is yet another object of the invention to provide such a palletizer capable of transferring sheets of cardboard or the like by virtue of a plurality of pusher arms which positively engage all of the sheet articles during transfer of the sheets across a layer-arranging table, and an overhead rake fence having a plurality of tines which positively engage all of the sheets when they are wiped from the transfer carriage onto a stacking platform.

These and other objects and features of the present invention will now be more fully described with reference to the following detailed description of a preferred embodiment and the accompanying drawings.

DRAWINGS

FIG. 8 is an enlarged, fragmentary view of the rake tines taken generally along the line 8—8 of FIG. 2, but here shown with the transfer carriage shifted downstream adjacent the finger rake;

DETAILED DESCRIPTION OF A PREFERRED EMBODIMENT

Figure 1:
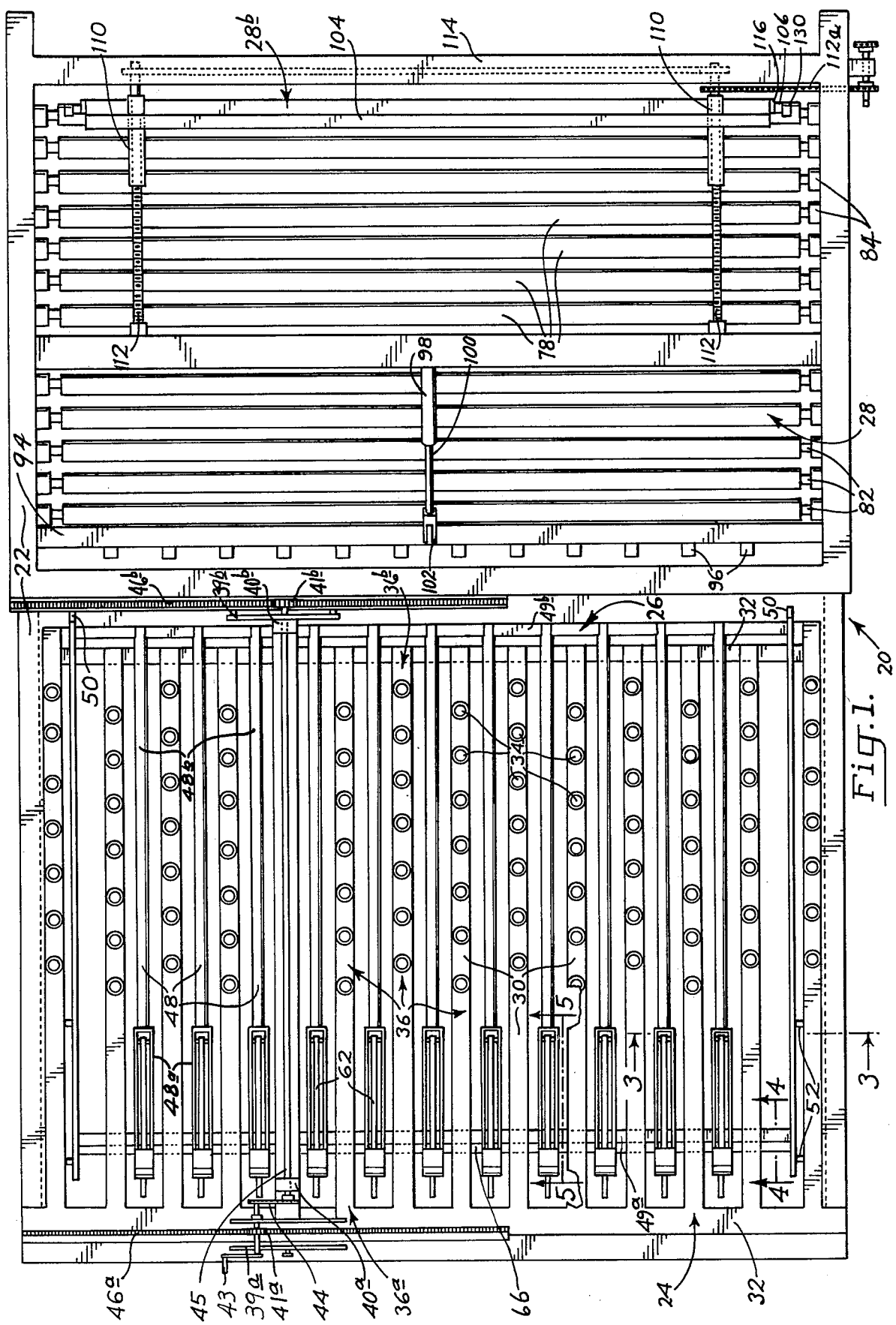
FIG. 1 is a top plan view of the article stacker of the present invention.
Figure 2:
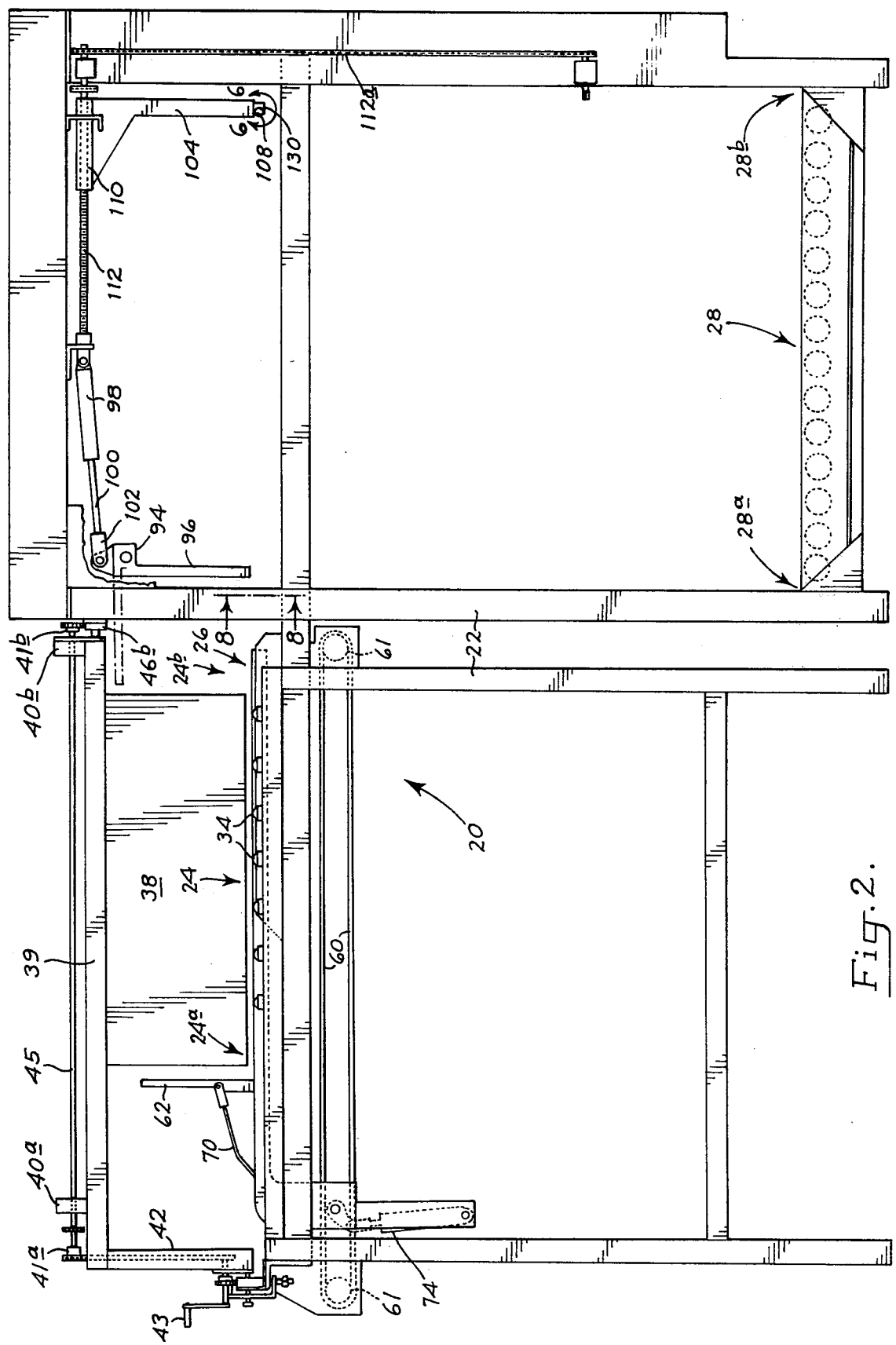
FIG. 2 is a side elevation view of the invention.

Referring now to FIGS. 1 and 2, there is shown generally at 20 article stacking apparatus of the present invention. The apparatus comprises a frame 22 on which are mounted a layer-arranging table 24, a horizontally shiftable transfer carriage 26 and a vertically shiftable stacking platform 28.

The layer-arranging table includes a plurality of laterally spaced, elongate tubes 30. These tubes are each attached at their opposite ends to parallel, horizontally disposed bars 32, which are secured to opposite sides of the frame. Each tube 30 supports a plurality of laterally spaced ball rollers 34 which collectively provide a low friction sliding surface for articles loaded onto the layer-arranging table. Tubes 30 and associated ball rollers 34 define article support members 36 having upstream and downstream end portions 36a and 36b, respectively. The plane of the upper surface of the layer-arranging table is defined herein as that plane occupied by the top portions of ball rollers 34.

Mounted above the layer-arranging table is an elongate-upright guide plate 38 (FIG. 2) extending substantially parallel to bars 30. Plate 38 is secured at its upper end to a bar 39 which has attached at its opposed end regions upstream and downstream plates 39a and 39b, and upstream and downstream bearings 40a and 40b. Rotatably mounted to upstream plate 39a is an upstream gear 41a, coupled by means of chain 42 (FIG. 2) to a crank 43 (FIG. 2). Gear 41a is also rotatably coupled by chain 44 (FIG. 1) to a rotatable rod 45 mounted on bearings 40a and 40b, and extending parallel to bar 39. Attached to the downstream end of rod 45 is a downstream gear 41b. Opposed gears 41a and 41b are adapted to ride in opposed linear gear tracks 46a and 46b, respectively, which are attached to frame 22 and extends transversely of tubes 30. As can be appreciated from FIG. 2, rotation of crank 43 effects rotation of gear 41a, thus shifting plate 38 along track 46a. Concomitantly, gear 41b, through its coupling to gear 41a, moves along gear track 41b, maintaining guide 38 substantially parallel to tubes 30 during lateral shifting of the guide plate. The guide plate may be secured in any selected position along its path of travel.

Figure 3:
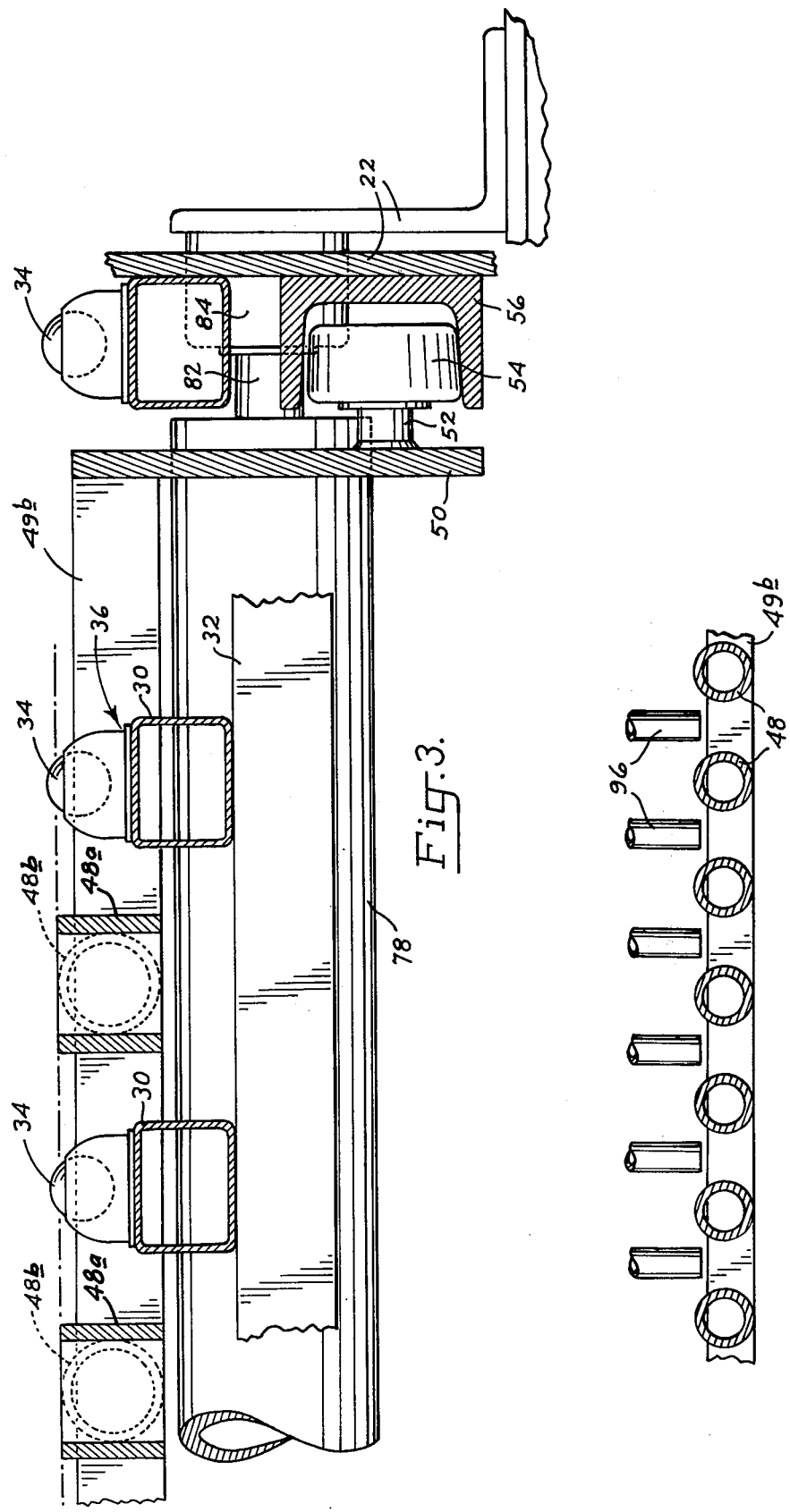
FIG. 3 is an enlarged fragmentary, view of a side portion of the layer-arranging table, transfer carriage, and the stacking platform taken generally along line 3—3 of FIG. 1.

With reference to FIGS. 1 and 3, horizontally shiftable transfer carriage 26 includes a plurality of laterally spaced elongate transfer members 48 which are individually interspersed between adjacent article support members 36. Each transfer member includes a tube 48b attached at its upstream end to an elongate channel member 48a, in which is mounted an associated pusher arm, as will be described below. Transfer members 48 are attached at their opposite ends to upstream and downstream transfer beams 49a and 49b. The plane of the upper surface of the transfer carriage, defined as the plane occupied by the top surfaces of transfer members 48, is positioned slightly below the plane of the layer-arranging table upper surface, as best seen in FIG. 3.

The opposite ends of beams 49a and 49b are attached to a pair of upright, elongate, shifting plates 50. Attached to the upstream end region of plates 50 on shafts 52 are rollers 54 which ride in channel-shaped roller guides 56 mounted along each side of the frame. The transfer carriage thus is adapted to be shifted from an upstream position in which elongate transfer members 48 substantially coextensive with article support members 36, and a downstream position in which the transfer carriage is vertically adjacent stacking platform 28. Carriage shifting means for selectively shifting the carriage between such positions generally includes motor-driven chains 60 which are trained about spaced sprockets 61 (FIG. 2) and are coupled to the transfer carriage by conventional means.

Figure 5:
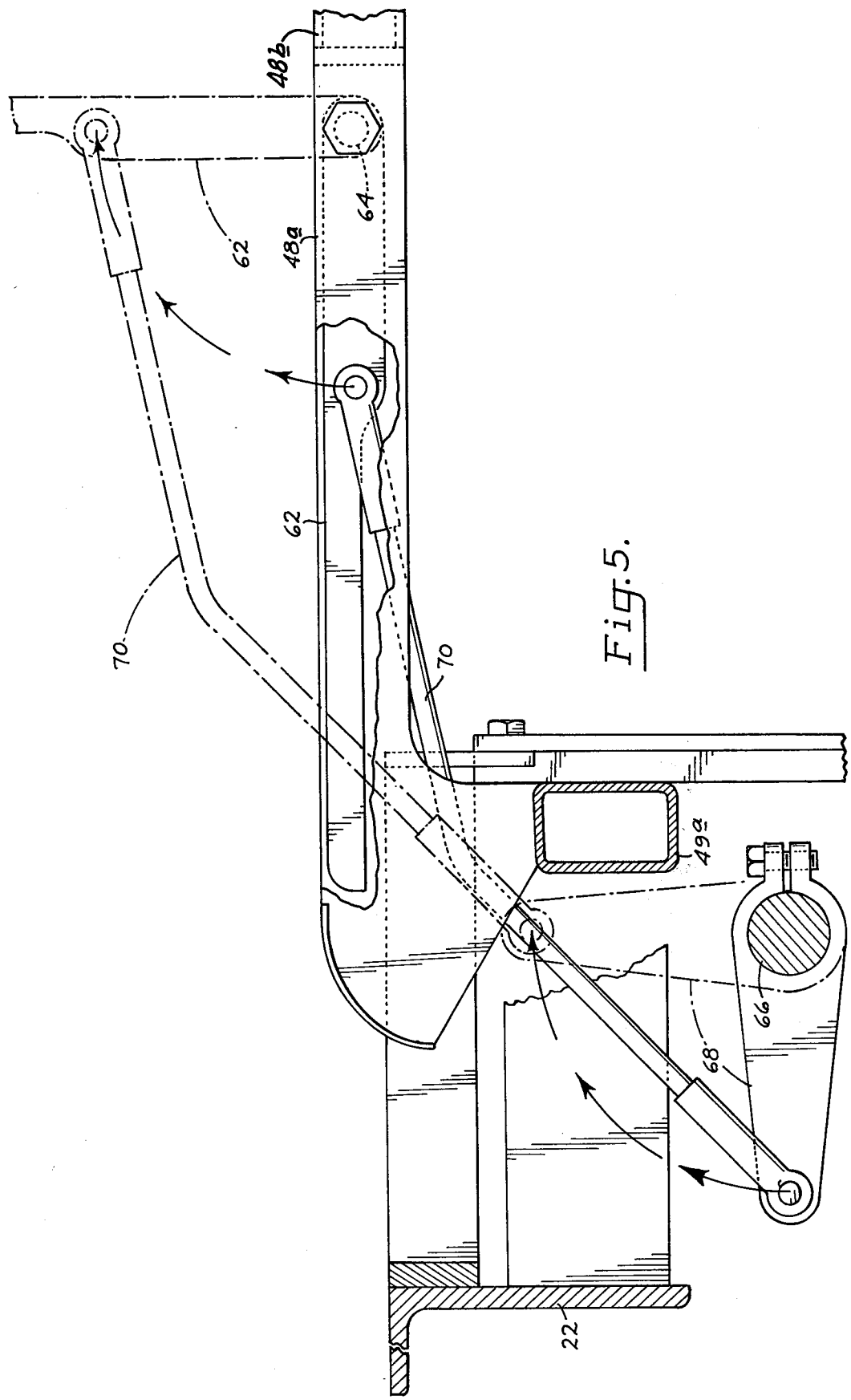
FIG. 5 is an enlarged, fragmentary view of pusher arm extending/retracting mechanism, taken generally along line 5—5 of FIG. 1.

Mounted within the channeled region of members 48a are a plurality of extendable/retractable pusher arms 62 aligned transversely with respect to the transfer members. With particular reference to FIG. 5, pusher arms 62 are mounted on the transfer members for selective positioning between extended, or raised, positions in which the arms are substantially vertically disposed and extend above the plane of the layer-arranging table and retracted, or lowered, positions in which the arms are positioned below the plane of the layer-arranging table. The extended and retracted positions are shown in broken and solid lines, respectively, in FIG. 5.

The positions of pusher arms 62 about their points of pivotal attachments 64 to transfer members 48 are coordinately controlled by a ram-activated shaft 66 which is rotatably attached at its ends to the upstream end portions of transfer carriage shifting plates 50, as seen in FIG. 1. Attached to shaft 66 are a plurality of laterally spaced lever arms 68, each arm being positioned adjacent an associated pusher arm 62.

Joining each lever arm 68 to its corresponding pusher arm 62 is a connecting rod 70, pivotally attached at its lower end to the distal end of an associated arm 68 and at its upper end to a point intermediate the ends of an associated pusher arm 62. It can be appreciated from FIG. 5 that as shaft 66 is rotated approximately 90° in the clockwise position, lever arm 68 moves from a substantially horizontal to a substantially vertical position, thereby shifting the pusher arm from its retracted to its extended position. Likewise, as shaft 66 is rotated approximately 90° in the counter-clockwise direction, the pusher arm is shifted from its extended to its retracted position.

Figure 4:
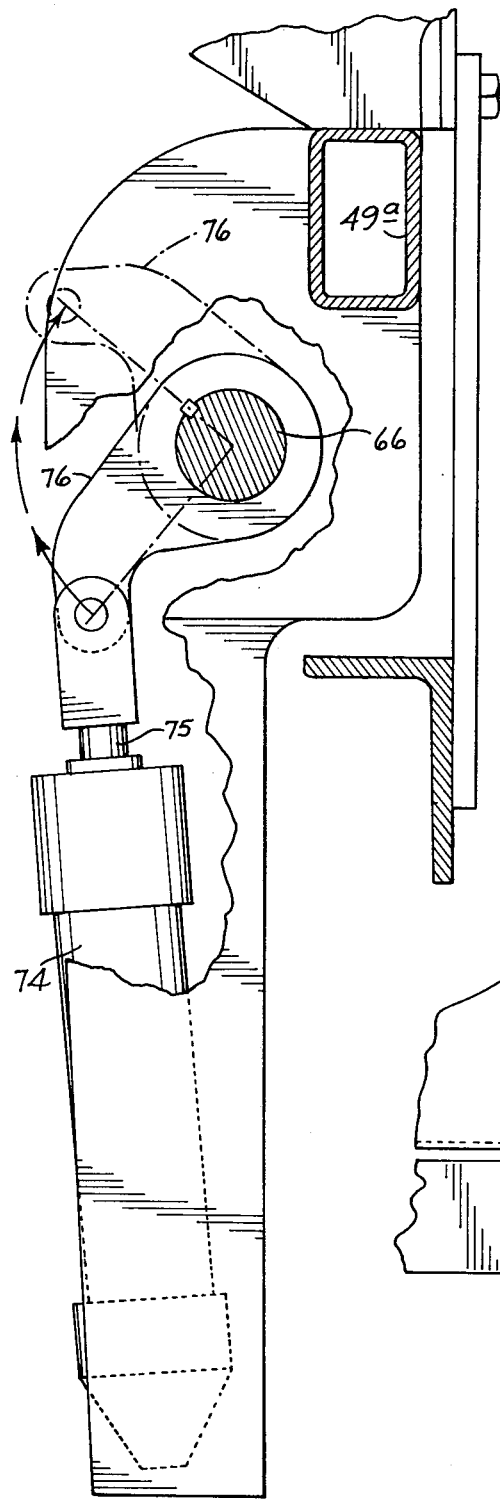
FIG. 4 is an enlarged fragmentary view of a pusher arm activating ram taken generally along line 4—4 of FIG. 1.

Shaft 66, lever arms 68, and connecting rods 70, attached to the upstream end of transfer carriage 26 as described above, are part of pusher arm elevator means which further includes a ram 74 attached to one of the shifting plates adjacent upstream beam 49a, as seen in FIGS. 2 and 4. Referring to FIG. 4, ram 74 provides a vertically extendable piston rod 75 coupled to shaft 66 by a coupling arm 76. As the piston rod is extended upwardly during ram actuation, (broken lines, FIG. 5), shaft 66 rotates approximately 90° in the clockwise direction, coordinately extending the pusher arms as described above. Conversely, shaft 66 rotates approximately 90° in the counterclockwise direction as the piston rod is retracted, thus to coordinately retract the pusher arms. Ram 74 is conventionally actuated by air pressure, the air hose connection between a fixed air supply and the ram being a flexible tube (not shown) which is free to follow the transfer carriage as the carriage moves between its horizontally shifted positions.

Vertically-shiftable stacking platform 28 includes a plurality of rollers 78 disposed transversely with respect to tubes 30, each roller having end projections 82 which are rotatably mounted to the frame by bearings 84, as seen in FIGS. 1 and 3. Platform 28 has an upstream end 28a adjacent the downstream end portion of the layer-arranging table and an opposite downstream end portion 28b spaced therefrom. The stacking platform is mounted on frame 22 for vertical shifting between a raised position, immediately below the plane of the transfer carriage, and selected lowered positions therebelow. Platform elevator means effecting such shifting may include a vertically positioned hydraulic ram operatively connected to the platform in a conventional manner.

The apparatus further comprises rake means mounted on frame 22 adjacent upstream end portions 28a of the stacking platform. As best seen in FIGS. 1 and 2, the rake means includes a rake 94 which is pivotally mounted on frame 22, substantially parallel to rollers 78. Rake 94 provides a plurality of laterally spaced tines, or fingers, 96 each of which aligned with a tube 30 of the layer-arranging table. Rake 94 is pivotable about its longitudinal axis between a receiving position, as shown in dotted lines in FIG. 2, wherein the rake fingers are horizontally disposed and spaced above the plane of transfer carriage upper surface, and a raking position, shown in solid line in FIG. 2, wherein the fingers are vertically disposed, with the free ends of the fingers extending into the spaces between the elongate transfer members when the transfer carriage is vertically adjacent the rake, as shown in FIG. 8.

Rake positioning means for shifting the rake between such receiving and raking positions includes a rake ram 98 having an extendable/retractable piston rod 100, and a coupling arm 102 connecting rod 100 with the pivotally mounted rake 94. Ram 98 is conventionally activated by air pressure. From FIG. 2 it can be appreciated that rake 94 is in its raking position when the ram piston is extended, and is moved into its receiving position as the ram is retracted.

The article stacking apparatus further comprises horizontally shiftable fence means for aligning the downstream edges of articles prior to sweeping such articles from the transfer carriage onto the stacking platform. As seen in FIGS. 1 and 2, the fence means includes an upright fence plate 104 mounted on frame 22 substantially parallel to rollers 78, and an edge member 106 which is pivotally mounted to the lower edge 108 of the fence plate. The fence plate is attached at its upper edge to a pair of opposed sleeves 110 which are parallel to the transfer carriage elongate members. Sleeves 110 are internally threaded to engage a pair of worm drives 112 rotatably attached to the frame, as shown in FIG. 2. A motor-driven endless chain 112a and a coupling endless chain 114 are used to rotate the two worm drives concurrently, thus to position the fence plate in the upstream or downstream direction.

Figure 6:
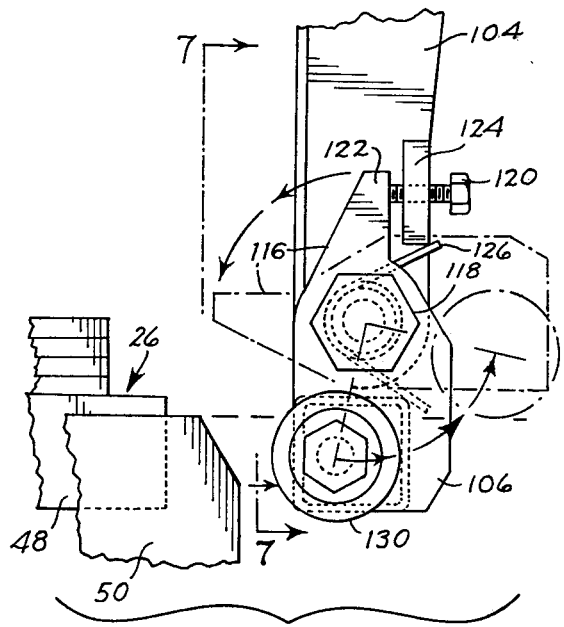
FIG. 6 is an enlarged side elevation view of the lower edge region of fence means noted at 6—6 in FIG. 2, but here shown in contact with the transfer carriage.
Figure 7:
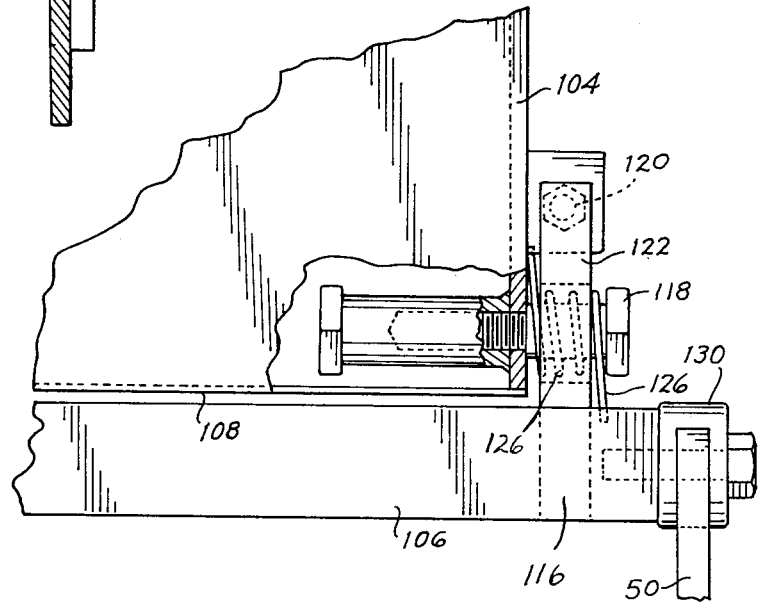
FIG. 7 is a fragmentary front elevation view of the lower edge region of the fence means taken along the line 7—7 in FIG. 6.

Referring to FIGS. 6 and 7, edge member 106 is pivotally attached at its opposite ends to fence plate 104 by rocker arms 116. Each rocker arm 116 is pivotally attached at its upper end to the lower side edge of the fence plate by a bolt 118, and securely attached at its lower end to edge member 106 which extends fully along underside of the fence plate. The extent of clockwise motion of the rocking arms is limited by a set screw 120 which engages the upper projection 122 of the rocker arm. Set screw 122 is threadably attached to a nut 124 secured to the side of the fence plate. A torsion spring 126 encircling bolt 118 is compressed at its projecting ends between nut 124 and the downstream top corner of edge member 106, biasing the rocker arm projection against set screw 120. Thus, the set screw is used to adjust the spring-biased vertical disposition of the edge plate.

Also as seen in FIGS. 6 and 7, the lower edge of fence plate 104 is positioned slightly above the upper plane of transfer carriage 26, with edge member 106 extending below such plane. As the transfer carriage is shifted downstream, the cammed downstream ends of carriage shifting plates 50 contact a pair of opposed rollers 130 attached at opposite ends to edge member 106, rotating the edge members from a lowered position (solid line, FIG. 6) to a raised position (dotted lines, FIG. 6) in which the lower edge of edge member 106 is in spring-biased contact with the upper surface of the transfer carriage elongate members.

Figure 9:
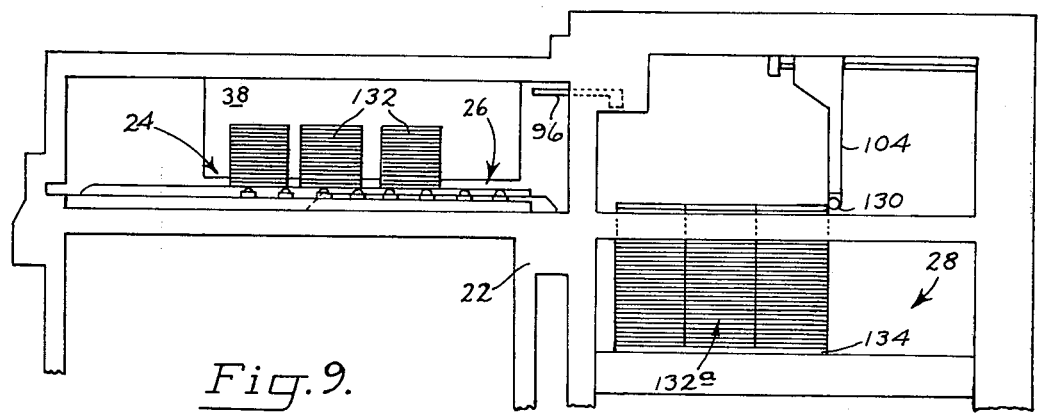
FIG. 9 is a diagrammatic side view of the invention shown with sheet articles loaded on the layer-arranging table.

The stacking operation performed by the article stacker of the present invention will now be described with reference to FIGS. 9 through 12. In FIG. 9, stacks of sheets, or other articles 132 are shown loaded in a single level layer onto layer-arranging table 24, with the sheet edges farthest from the viewer abutting guide plate 38. At this step, transfer carriage 26 is in its upstream position, with its pusher arms 62 retracted beneath the plane of the layer-arranging table upper surface. A previously deposited layer of articles 132a formed on stacking platform 28 is supported on a pallet 134. Edge plate 104 is pressed against the upper downstream edge of the article stack.

Figure 10:
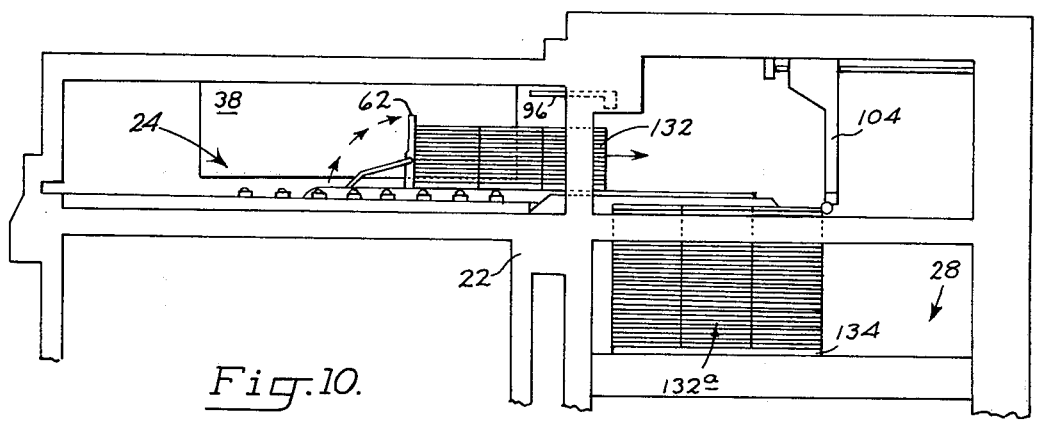
FIG. 10 is a view similar to FIG. 9, showing the transfer carriage during downstream shifting, transferring sheet articles across the layer-arranging table.

Viewing FIG. 10, pusher arms 62 are now raised to their extended positions and transfer carriage 26 is shifted downstream, carrying the layer of articles 132 downstream. From FIG. 5, it may be appreciated that pusher arms 62 are effective to engage the lowermost sheets of article stack 132 as the transfer carriage is shifted relative to the layer-arranging table. During this transfer, finger rake 94 is in its raised, receiving, position.

Figure 11:
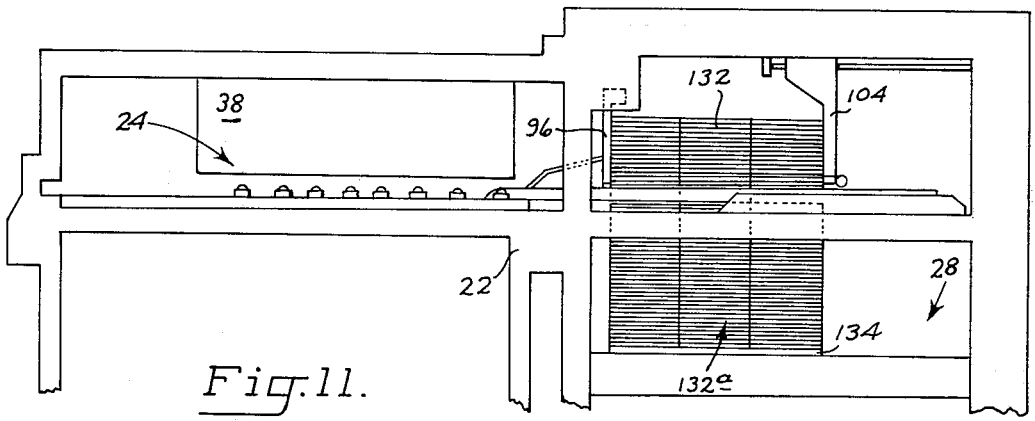
FIG. 11 is a view similar to FIG. 9, showing the carriage shifted fully downstream and the overhead rake fence engaged against the upstream edge of the articles.

As transfer carriage 26 is shifted further downstream, the downstream ends of shifting plates 50 contact rollers 130, pivoting the edge member 106 upwardly. The edge member is retained in spring-biased contact with the upper surfaces of the carriage elongate transfer members. This contact prevents the lowermost sheets of the layer of articles 132 from being carried under the fence plate and jammed between the fence plate and the transfer carriage. As illustrated in FIG. 11, fence plate 104 retains the stack 132 in a desired downstream position, as the transfer carriage is shifted fully downstream.

Figure 12:
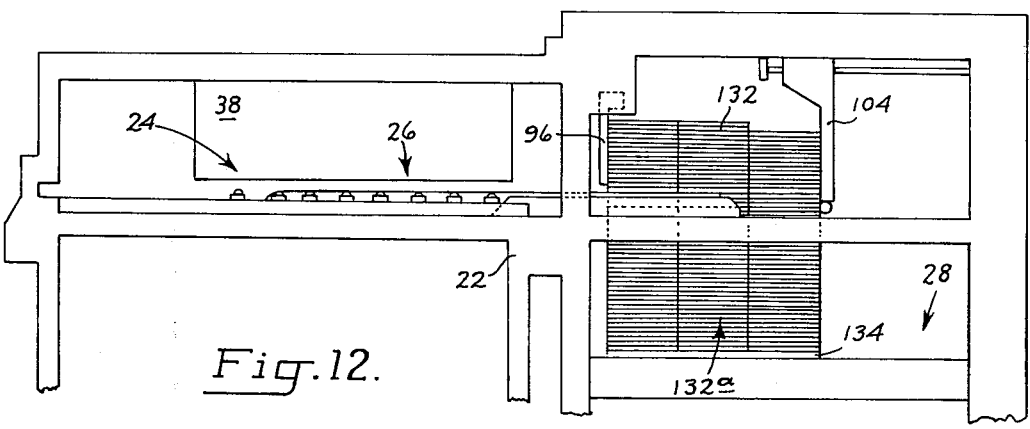
FIG. 12 is a view similar to FIG. 9 showing sheet articles being wiped on to the stacking platform as the transfer carriage moves upstream.

Finger rake 94 is now shifted to its lowered raking position (FIG. 11), wherein the free ends of rake fingers 96 extend into the spaces between the carriage transfer members 48, as shown in FIG. 8. Rake fingers 96 thus positivey engage the sheets in stack 132 as the carriage is returned upstream, sweeping layer 132 onto layer 132a, as is shown in FIG. 12. Prior to upstream return of the transfer carriage, pusher arms 62 are retracted, or lowered, to allow the transfer carriage to be shifted in an upstream direction below the plane of the layer-arranging table, where a new stack of sheet articles may be loaded onto the layer-arranging table during the above-described raking operations. This sequence of operations is repeated until a desired article stack on the stacking platform is formed.

While a preferred embodiment of the invention has been described herein, it should be apparent to those skilled in the art that other variations and modifications are possible without departing from the spirit of the invention.

It is claimed and desired to secure by Letters Patent:

1. Apparatus for stacking articles comprising
   a frame,
   a layer-arranging table mounted on said frame, the upper surface of said table being formed by a plurality of laterally spaced article support members having portions defining upstream and downstream end portions of the table,
   a transfer carriage mounted for shifting horizontally on said frame, the upper surface of said carriage being formed by a plurality of laterally spaced, elongate transfer members interspersed between said articles support members, opposite end portions of said transfer members defining upstream and downstream end portions of said carriage, with the upper surface of said carriage lying below the plane of the upper surface of said article support members,
   a stacking platform mounted for vertical shifting on said frame from a position immediately below the plane of said transfer carriage to selected positions there below, said platform having an upstream end portion adjacent the downstream end portion of said layer-arranging table and an opposite downstream end portion,
   a plurality of extendable-retractable pusher arms mounted on said carriage adjacent the upstream end portion thereof,
   rake means mounted for vertical shifting on said frame, said rake means being mounted adjacent the upstream end portion of said stacking platform,
   transfer carriage shifting means for selectively shifting said transfer carriage between a loading position in which the upstream end portion of said carriage is adjacent the upstream end portion of said layer-arranging table, and a stacking position in which the upstream end portion of said carriage is adjacent the upstream end portion of said stacking platform, pusher arm elevator means for selectively shifting said arms between extended positions in which the arms extend substantially above the plane of the layer-arranging table and retracted positions in which the arms lie below the plane of the upper surface of the layer-arranging table, rake positioning means for selectively shifting said rake means between a receiving position in which the rake means is spaced substantially above the plane of said carriage and a raking position in which said rake means is located vertically adjacent the upper surface of said carriage, and fence means mounted on said frame for selective upstream/downstream shifting above said stacking platform for aligning downstream edges of articles when such articles are transferred on said transfer carriage to a position above said stacking platform, said fence means comprising a fence plate having a lower edge spaced above the plane of the upper surface of the transfer carriage and an edge member mounted adjacent the lower edge of said fence plate for upward swinging movement when said edge plate is contacted by said transfer carriage as the transfer carriage is shifted in a downstream direction thereunder.

2. The apparatus of claim 1 wherein said edge member is mounted adjacent the lower edge of said fence plate for upward swinging motion between a lowered position in which the lower edge of said edge plate extends below the plane of the upper surface of said carriage and a raised position in which the lower edge of said member contacts the upper surface of said carriage.

3. The apparatus of claim 2 wherein said edge member is spring-biased toward its lowered position.

4. Apparatus for stacking articles comprising
a frame,
a layer-arranging table mounted on said frame, the upper surface of said table being formed by a plurality of laterally spaced article support members having portions defining upstream and downstream end portions of the table,
a transfer carriage mounted for shifting horizontally on said frame, the upper surface of said carriage being formed by a plurality of laterally spaced elongate transfer members interspersed between said article support members, opposite end portions of said transfer members defining upstream and downstream end portions of said carriage, with the upper surface of said carriage lying below the plane of the upper surface of said article support members,
a stacking platform mounted for vertical shifting on said frame, from a position immediately below the plane of said transfer carriage to selected positions therebelow, said platform having and upstream end portion adjcent the downstream end portion of said layer-arranging table and an opposite downstream end portion,
a plurality of elongate extendable-retractable pusher arms, each mounted adjacent one of its ends, on an associated transfer member adjacent the upsteam end portion of said carriage, said arms being mounted for pivoting between extended positions wherein said arms are substantially vertically disposed and extend through the plane of the upper surface of said layer-arranging table and retracted positions wherein the arms lie below such plane,
a rake mounted adjacent the upstream end portion of said stacking platform for shifting relative thereto between a receiving position in which said rake is spaced substantially above the plane of the upper surface of said carriage, and a raking position, said rake having a plurality of laterally-spaced fingers positioned to extend into spaces between said carriage transfer members when said rake is in its raking position,
transfer carriage shifting means for selectively shifting said transfer carriage between a loading position in which the upstream end portion of said carriage is adjacent the upstream end portion of said layer-arranging table, and a stacking position in which the upstream end portion of said carriage is adjacent the upstream end portion of said stacking platform,
pusher arm elevator means for selectively positioning said arms between their extended and retracted positions, and
rake positioning means for selectively positioning said rake between its said receiving and raking positions.

5. The apparatus of claim 4 which further comprises a layer-arranging table guide plate mounted for shifting movement transversely of said layer-arranging table article support members.

6. The apparatus of claim 4 wherein said layer-arranging table article support members each include a plurality of ball rollers arranged in rows extending longitudinally of said layer-arranging table.

* * * * *